United States Patent [19]
Condit

[11] 4,168,615
[45] Sep. 25, 1979

[54] CLOTHES WASHING MACHINE WITH WATER RECIRCULATION

[75] Inventor: Robert E. Condit, Louisville, Ky.

[73] Assignee: General Electric Company, Louisville, Ky.

[21] Appl. No.: 906,515

[22] Filed: May 17, 1978

[51] Int. Cl.² ............... D06F 39/08; F16K 21/18
[52] U.S. Cl. ................................. 68/207; 68/208; 137/387; 137/403
[58] Field of Search ............... 68/207, 208; 134/56 R, 134/56 D, 57 R, 57 D; 137/387, 389, 393, 403

[56] References Cited
U.S. PATENT DOCUMENTS

| | | | |
|---|---|---|---|
| 2,687,216 | 8/1954 | Shelton | 210/463 |
| 3,014,358 | 12/1961 | Bochan | 68/4 |
| 3,024,914 | 3/1962 | Robson | 210/456 |
| 3,153,927 | 10/1964 | Alger | 68/207 X |
| 3,367,153 | 2/1968 | Brubaker et al. | 68/207 X |
| 3,476,038 | 11/1969 | Dicmas | 210/416 X |
| 3,490,486 | 1/1970 | Cushing | 68/207 X |
| 3,502,220 | 3/1970 | Kohlberg | 210/416 |
| 3,885,580 | 5/1975 | Cushing | 134/57 D |

*Primary Examiner*—Philip R. Coe
*Attorney, Agent, or Firm*—Bruce A. Yungman; Radford M. Reams

[57] ABSTRACT

A clothes washing machine which recirculates wash or rinse water from a surrounding tub into a clothes holding basket to reduce the quantity of water required for wash and rinse cycles. The fill level is controlled by an adjustable pressure-sensitive switch which senses the pressure level at the drain outlet located in the bottom of the tub in order to control water fill levels at the beginning of each wash and rinse cycle. The pressure-sensitive switch is reset preparatory to the initiation of each wash or rinse cycle of the tub by the low pressure existing in the tub bottom after the tub has been drained at the end of each wash and rinse cycle. In order to prevent false resetting of the pressure-sensitive switch by recirculation flow from the tub, the recirculation pump inlet intake is elevated above the drain outlet by a stand pipe which maintains a sufficient level of water in the tub above the reset pressure level to preclude resetting of the pressure-sensitive switch until the tub is drained through the drain outlet. The stand pipe is designed to provide an anti-vortex action to minimize the air intake into the recirculation pump.

4 Claims, 4 Drawing Figures

CLOTHES WASHING MACHINE WITH WATER RECIRCULATION

BACKGROUND DISCUSSION

This invention concerns clothes washing machines and more particularly such machines in which resettable pressure switches are utilized for sensing and controlling the water level during filling of the tub and basket at the beginning of each wash or rinse cycle.

A common approach in providing automatic control over the fill level of washing machines has involved the use of a pressure-sensitive switch, such as a diaphragm-spring combination which acts to sense the water pressure in the bottom of the washing machine tub. Upon achieving a certain predetermined level of water in the tub corresponding to the adjusted setting of the pressure-sensitive switch, the sensing of the corresponding pressure level causes a solenoid-operated fill valve to be shut off, thus accurately determining the level of water added to the machine.

Some washing machines include recirculation pumps which circulate a portion of the tub water through the lint filter during washing cycles, which cause water level variations in the tub during recirculation. The agitation cycle also causes variations in the water level within the tub during the cycle and it is therefore necessary to prevent the pressure-sensitive switch from falsely activating the fill valve, causing more water to be added to the tub during the wash or rinse cycles.

In many designs, the pressure-sensitive switch has been designed to be "resettable" in that the pressure head sensed must drop down to a predetermined low level in order to again open the solenoid-operated fill valve. The pressure-sensitive switch cannot then be falsely activated and will not again be responsive to pressure head levels until after the tub water level has been reduced at the end of either the wash or rinse cycle. This thereby prevents variations in tub water level from causing such false opening of the fill valve during the wash or rinse cycle.

While the use of a resetting pressure-sensitive switch is generally satisfactory, a problem may arise in recirculation systems, where extremely low tub water levels may occur. Particularly, such a situation may arise in those systems which allow for adjustable water levels as an economy measure. When low water levels are selected, recirculation of water from the tub can result in water levels in the tub declining to the point where the pressure-sensitive switch is reset and thus causes a false operation of the fill valve to add water during the wash or rinse cycle.

Most modern washing machine designs include an outer tub which receives a perforated clothes receiving basket, an agitator within the basket being agitated during washing or rinsing and the basket spun during the extract cycle with the water passing out through the perforate basket and received into the outer tub. The water collected in the tub is caused to be pumped to a plumbing drain through a drain located at the bottom of the tub. Since the basket is perforated, the water level is the same in tub and basket.

It has been recognized that since the volume of water between the tub and basket does not perform a useful washing function, a recirculation system could allow the use of lesser volumes of water for a given wash load. This could be achieved by providing a limited number of perforations in the basket located in the lower region thereof to insure equalized levels during the fill cycle and causing a recirculation pump to pump water emptying through the basket bottom perforations into the tub back into the basket during the wash and rinse cycles. The water level in the tub is thereby reduced to be substantially below that in the basket. This in effect results in a lesser volume of water being required for a given clothes load size. Examples of such systems are found in U.S. Pat. Nos. 3,014,358 and 3,153,924.

In these systems, as well as in the lint removal recirculation washing machines described above, the recirculation pumps generally operate whenever the washing machine motor is being driven and thus for relatively low selected water levels, the recirculation pump may reduce the water level in the tub to a point where the pressure-sensitive switch is reset to thus again cause the false operation of the fill valve and result in water being added unnecessarily.

While there is generally always a slight level of water above the level at which the pressure-sensitive switch tap is located, pressure-sensitive switches which can reliably distinguish pressure head differences at such low levels cannot be produced at reasonably low costs.

It is accordingly an object of the present invention to provide a reliable arrangement for insuring that the water level in the tub above the point at which the pressure-sensitive switch senses the pressure level will always be sufficient to insure that the pressure sensor will not reset. The pressure-sensitive switch will not thereby be reset even if the recirculation pump reduces the water level in the tub to the lowest flow level of the intake into the recirculation pump inlet.

It is a further object of the present invention to provide such an arrangement which does not require extensive redesign of the washing machine components and which may be simply and inexpensively added to the washing machine.

SUMMARY OF THE INVENTION

These and other objects of the present invention, which will become apparent upon a reading of the following specification and claims, are accomplished by an arrangement in which the inlet of the recirculation pump receives water at an inlet level which is predetermined at a height above the sensing point of the pressure sensitive switch established to be above the reset pressure level of the switch. This arrangement is provided by the recirculation pump inlet being routed through a stand pipe mounted within a tub bottom opening extending upwardly from the bottom of the tub such that the level of water is never reduced below the level of the stand pipe, notwithstanding the degree with which the recirculation pump acts to reduce the water level in the tub. The pressure-sensitive switch senses the pressure level in the tub via a fluid connection with an air chamber located in communication with the drain outlet. The chamber is located so that the pressure head at the predetermined minimum water level insures that the pressure switch will not be reset until the water in the tub is substantially completely drained through the drain outlet at the end of each wash or rinse cycle.

The stand pipe has an anti-vortex configuration minimizing the intake of air and water due to the formation of the vortex at the intake of the recirculation pump inlet.

DETAILED DESCRIPTION

In the following detailed description, certain specific terminology will be utilized for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

The arrangement according to the present invention is contemplated as having particular utility in conjunction with water saving designs in which the volume of water required to carry out a washing and rinsing cycle is reduced by causing the water normally present between the tub and the clothes holding basket to be recirculated from the tub into the clothes holding basket, such that most of the water is confined to the basket. As such, the water level in the tub is normally much below that of the basket. The invention has particular application to this type of washing machine since the recirculation pump acts to reduce the water level in the tub to very low levels.

Figure 1:
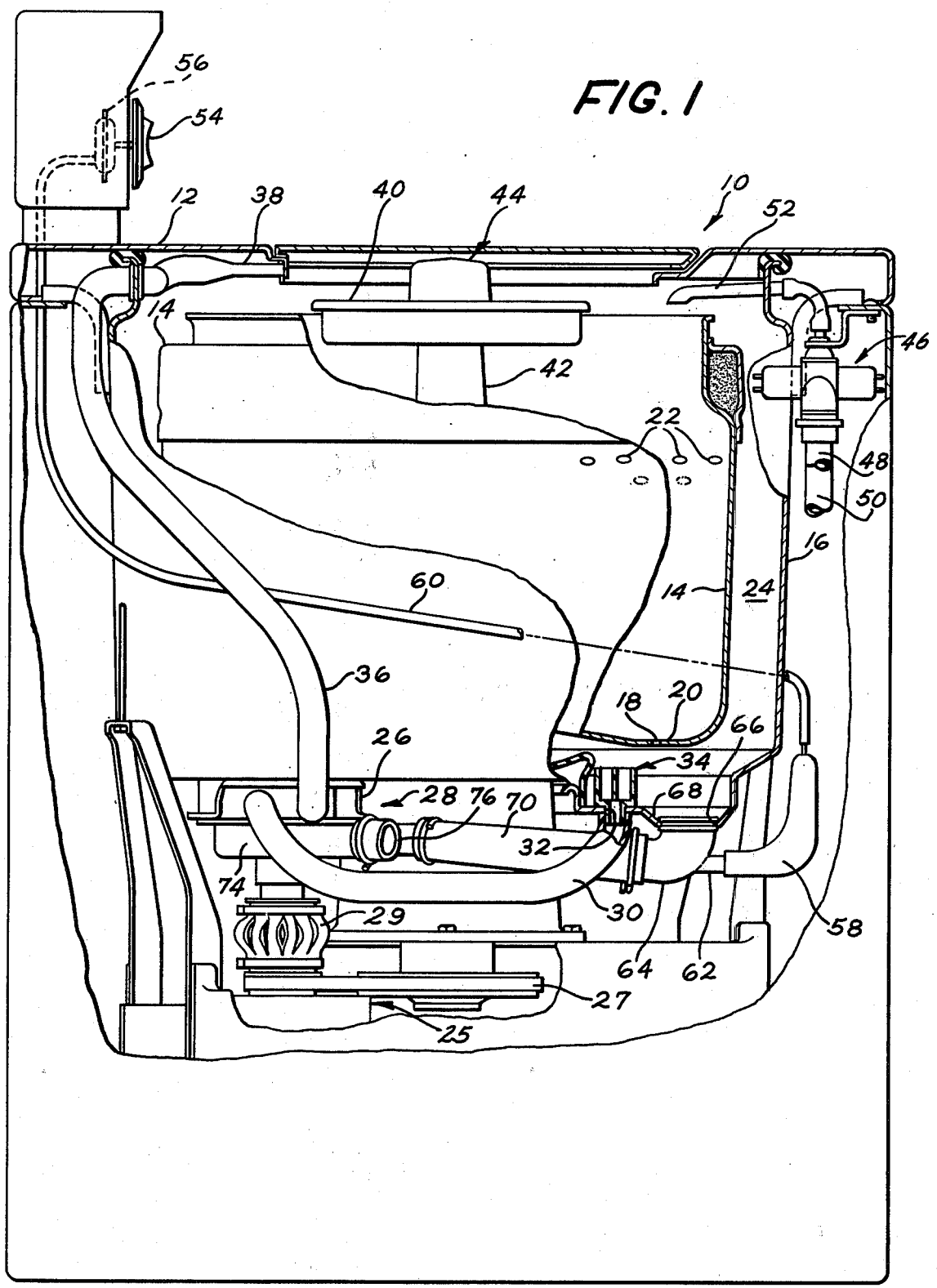
FIG. 1 is a side elevational view of a washing machine incorporating the arrangement according to the present invention shown with the exterior cabinet partially broken away and certain of the components in partial section.

Such a recirculating clothes washing machine 10 is depicted in FIG. 1. The washing machine 10 includes the outer cabinet 12 within which is housed the clothes holding basket 14 and the outer tub 16. The basket 14, rather than being provided with perforations distributed about its outer surface as in conventional machines, is provided with just two series of perforations, bottom openings 18 formed in the bottom 20 of the basket 14 which equalize the water level in the tub and basket during the fill cycle, and overflow openings 22 located at a predetermined level above the bottom of basket 14 which set the maximum water level in the basket 14.

The flow of water from the basket 14 into the tub 16 is thereby controlled at a rate allowed by the bottom openings 18. This rate is selected to be sufficiently low as to enable the level of water in the tub 16 to be reduced below that in the basket 14 such that the water contained in the space 24 intermediate the basket 14 and tub 16 may be pumped out into the basket 14.

This is achieved by a recirculation pump comprised of the recirculation pump deck 26 of a two-deck pump assembly 28. The pump assembly 28 is driven by a motor-clutch assembly 25 which also serves to drive the basket 14 during spin and the agitator 44 during wash or rinse via drive belt 27.

By a flexible coupling 29, drive is established to the pump assembly 28 whenever the basket 14 is being spun or the agitator 44 oscillated.

The drive is reversed for agitation and spin cycles so that pumping action of each deck of the pump assembly 28 may be controlled by reversely mounting the impellers of the respective pump decks, as will be described hereinafter.

The recirculation pump deck 26 is mounted so as to pump whenever the motor-clutch assembly 25 is driving in a direction to cause agitation drive, but does not produce pumping action when the drive is reversed during spin, in a manner well known to those skilled in the art.

The recirculation pump deck 26 has an inlet hose 30 having one end communicating with an inlet opening 32 formed in the bottom of the tub 16. The hose 30 is received over the protruding extension of a stand pipe 34, positioned within the interior of the tub 16 and having its extension passing through the pump inlet opening 32.

The purpose of the stand pipe 34 will be described in further detail below.

The outlet of the recirculation pump deck 26 is directed into an outlet hose 36 extending to the upper region of the cabinet 12 and having a nozzle 38 mounted to extend substantially horizontally and direct recirculation flow into the interior of the lint tray 40. The lint tray 40 is mounted in conventional fashion to the center post 42 of the agitator 44. The lint tray 40 serves to remove lint from the recirculated water in the conventional fashion. After passing through the lint tray 40, the recirculation flow is received in the interior of the basket 14.

The sizing of the basket bottom openings 18 and the capacity of the recirculation pump deck 26 are such that the recirculation pump will remove the water from the tub 16 at a faster rate than it enters via the bottom openings 18. This allows the water level in the tub 16 to be reduced far below that in the basket 14, in order that the total volume of water required is reduced.

A series of overflow openings 22 are provided so that at the maximum water level, flow from the recirculation pump deck 26 is prevented from raising the water level in the basket 14 beyond the level at which the overflow openings 22 are located. This insures that the water level in the basket 14 will not exceed the maximum water level at which proper washing action will be achieved. The overflow openings 22 are therefore sized to be of sufficient large diameter that the flow out of the basket 14 will exceed the recirculation pump deck 26 capacity.

In addition, the overflow openings 22 allow for the water to be passed out of the basket 14 and collected into the tub 16 during the extraction cycle while the basket 14 is spun.

The arrangement for initially filling the tub 16 and basket 14 with water at the start of each wash or rinse cycle includes a conventional solenoid-operated fill valve 46 which receives supply of water from the hot and cold hoses 48 and 50, respectively, and through fill spout 52 directs the water into the interior of the basket 14 and tub 16. Preferably, the fill spout 52 is designed to direct flow simultaneously into both the basket 14 and tub 16.

The fill valve 46 is operated by the machine controls which include the fill level control knob 54 cooperating with a pressure-sensitive switch means 56 to allow a selective control over the level to which the basket 14 is initially filled at the start of each cycle, to enable the quantity of water to be matched to the clothes load size. The pressure-sensitive switch 56 senses the pressure head created by the water level in the tub 16 by means of an air chamber 58, which is connected via a length of tubing 60 to one side of a diaphragm normally included in such pressure-sensitive switches 56. The air chamber 58 is secured to a pressure tap 62 located in a drain elbow 64.

The drain elbow 64 is mounted to an outlet opening 66 as located in a depression 68 formed in the tub bottom so as to collect the water into the drain elbow 64. The drain elbow 64 is secured by means of a length of hose 70 to the inlet of the drain pump deck 74 of the pump assembly 28.

The outlet of the drain pump deck 74 is connected to a hose (not shown) which directs the drain flow to the drain or storage tank. The pressure-sensitive switch 56 is of a design commonly utilized in modern washing machines in which the switching action is resettable and adjustable.

That is, the control knob 54 allows the operator to vary a spring pressure exerted on a diaphragm such that the operating pressure head to which the pressure-sensitive switch 56 is subjected is varied in accordance with the position of the control knob 54. The machine controls initiate opening of the fill valve 46 causing water flow into the basket 14 and tub 16 until a predetermined level at which the pressure head corresponding to the selected adjustment of the control knob 54 causes the opening of the pressure-sensitive switch 56, de-energizing the fill valve 46 and closing off the supply lines 48 and 50.

In order to enable simplified control, the pressure-sensitive switch 56 is also resettable so that once it has responded to the achievement of the predetermined fill level, any decline in the level and corresponding changes in the pressure head sensed at the air chamber 58 will not cause the fill valve 46 to again be in a position to be energized until the level has declined to a very low level. This corresponds to the operation of the drain system at the end of each wash or rinse cycle, which drains the tub 16 completely.

Thus, as the tub water level varies due to the operation of the recirculation pump deck 26 or the movement of water during agitation, the pressure-sensitive switch 56 will not reset until the water pressure acting on the air chamber 58 is reduced to a very low level during the extract cycle.

The fill level controls and the pressure-sensitive switch 56 are of the type very well known to those skilled in the art and suitable such switches are commercially available. Accordingly, a description of the details of the same are not here included, nor are those of the machine control system.

Figure 2:
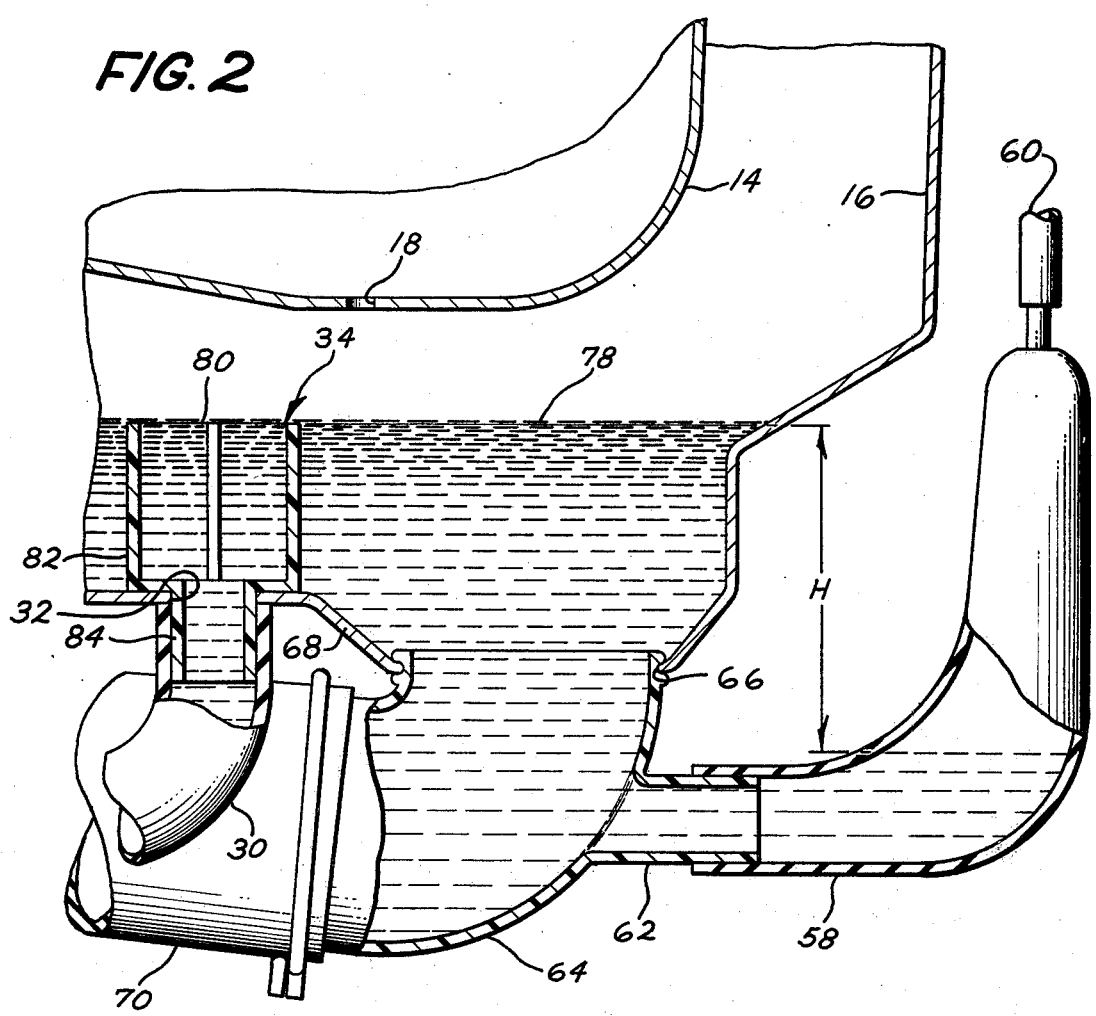
FIG. 2 is an enlarged view of a portion of the washing machine tub and basket shown in FIG. 1 depicting the details of the installation of the stand pipe, the drain outlet and the pressure-sensitive switch air chamber.

Referring to FIG. 2, the details of the recirculation pump inlet 32, the stand pipe 34 and the air chamber 58 are depicted. It can be seen that the stand pipe 34 can cause a predetermined minimum level of liquid indicated at 78 to remain after the recirculation pump deck 26 (not shown) has pumped the water into the tub 16 down to the level of the intake 80 defined by the upper end of the stand pipe 34. The remaining pressure head H between the water level 78 and the level of the air chamber 58 is selected to be such that false resetting of the pressure-sensitive switch 56 is precluded. This arrangement thus provides a means for establishing a predetermined pressure head above the air chamber 58 at the point when the recirculation pump deck 26 has pumped the water level down to the level of the intake 80, which pressure head is above the minimum reset pressure of the pressure-sensitive switch 56.

Since such currently available pressure-sensitive switches generally indicate a reset head in the range of two inches or less pressure head, the head H is selected to be in excess of such reset pressure values, i.e., greater than a two inch depth.

The stand pipe 34 preferably of molded plastic consists of a large diameter cylindrical section 82 which is integral with a small diameter extension 84 which is received in the inlet opening 32 which affords the connection for connecting the hose 30.

The use of the stand pipe 34 allows a bottom-mounted recirculation pump inlet by precluding reduction in water level in the tub 16 to levels that would tend to produce false resetting of the pressure-sensitive switch 56.

It is necessary that the air chamber 58 be vented after each drain cycle since if water is allowed to remain in the air chamber 58, the subsequent pressure-sensitive switch 56 activation may be at a slightly higher pressure level to cause a variation in the selected fill levels. This arrangement allows the location of the air chamber 58 to be properly related with the inlet of the drain pump deck 74 while producing the proper predetermined minimum level 78 in the tub 16.

Figure 3:
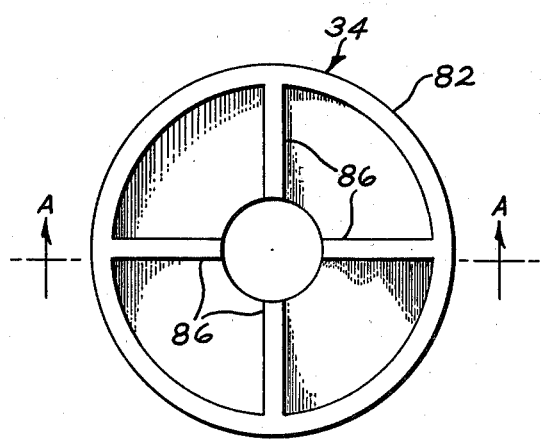
FIG. 3 is a plan view of the stand pipe shown in FIG. 2.
Figure 4:
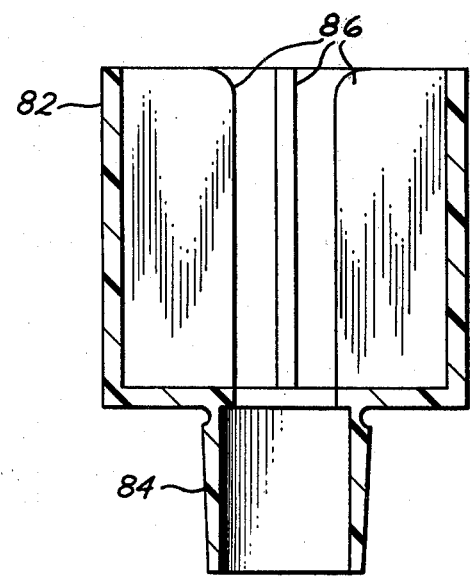
FIG. 4 is a sectional view of the stand pipe taken at A—A in FIG. 3.

The stand pipe 34 may also advantageously be configured such as to reduce the vortex action of the water as it drains into the interior of the cylindrical section 82 of the stand pipe 34. Such vortex action creates a simultaneous drawing in of both air and water into the recirculation pump which tends to produce blockage of pumping action due to the presence of air blockage in the pump chamber. Such anti-vortex configuration may be provided as seen in FIGS. 3 and 4 by the use of radial vanes 86, molded integrally with the cylindrical section 82 and extending inwardly to a point adjacent the interior diameter of the smaller diameter extension 84 as seen in FIG. 4. The presence of the radial vanes 86 tends to defeat the vortex action.

It will be appreciated that the objects of the present invention have been achieved in that resettable pressure-sensitive switches can be utilized to control the fill level without incidence of false resetting caused by the recirculation pump reducing the water level in the tub to the resetting pressure. This has been accomplished by a very simple design which allows the recirculating pump inlet to be located in the tub bottom and the air chamber pressure tap to be located in its proper relationship to the drain pump inlet. The use of the anti-vortex configuration of the stand pipe tends to reduce the tendency to produce a vortex flow into the opening of the stand pipe to minimize interruptions in the recirculation pump operation.

While the use of a stand pipe has been disclosed, the use of a dropped location of the elbow 64 can also provide a means for maintaining the predetermined water level above the pressure tap 62 with the recirculation level reduced to the intake of the recirculation pump deck 26.

The embodiments of the invention in which an exclusive property or privilege is claimed are defined as follows:

1. A clothes washing machine including a clothes receiving basket and a tub enclosing said basket in surrounding relationship, said basket having openings formed therein allowing controlled flow of water from the interior of said basket into said surrounding tub;

agitator means for carrying out washing and rinsing of said clothes disposed in said basket;

recirculation means including a recirculation pump having an inlet and outlet;

means connecting the inlet of said recirculation pump to an opening in the bottom of said tub and the outlet of said recirculation pump directing water flow into said basket, whereby water passing into said tub through said basket is recirculated into the interior of said basket;

drive means driving said agitator means during wash and rinse cycle;

means drivingly connecting said recirculation pump means and said drive means to continuously produce a recirculation pumping action whenever said drive means is operated to reduce the level of water in said tub during said wash and rinse cycles;

water fill means comprising a fill spout adapted to direct water flow into the interior of said water and tub; and fill valve means operative to control communication of a water supply with said fill spout;

drain means for draining said tub and basket after each of said wash and rinse cycles, including a drain extending from the bottom of said tub;

resettable pressure-sensitive switch means responsive to the achievement of a predetermined pressure head in said tub to cause said fill valve means to discontinue water flow into said fill spout, said resettable pressure-sensitive switch means including reset means preventing reopening of said fill valve means upon decline of the pressure head in said tub below said predetermined pressure head until the pressure head has declined to a predetermined reset pressure head in said tub;

said resettable pressure-sensitive switch means including a pressure sensing tap located in said drain sensing the pressure head in said drain at a predetermined level below said level of said opening in said tub bottom connected to said recirculation pump corresponding to a pressure head in excess of said predetermined reset pressure head;

whereby said resettable pressure-sensitive switch means is prevented from resetting by the pumping action of said recirculation pump.

2. The clothes washing machine according to claim 1 further including a stand pipe mounted at said recirculation pump inlet opening in said tub bottom, said stand pipe extending above said tub bottom a distance above said tub bottom corresponding to a pressure head substantially in excess of said predetermined reset pressure head level.

3. The clothes washing machine according to claim 2 wherein said stand pipe comprises a cylindrical tube section mounted above said recirculation pump inlet in said tub section, wherein said stand pipe further includes an extension extending through said inlet opening and wherein said means connecting said inlet of said recirculation pump includes a hose mounted to said stand pipe extension.

4. The clothes washing machine according to claim 2 wherein said stand pipe comprises a cylindrical section mounted to said recirculation pump means inlet and wherein the cylindrical sections formed with radially extending vanes are positioned in the interior of said cylindrical section, whereby vortex flow into said section is thereby reduced by said radially extending vanes.

* * * * *